(12) United States Patent
Epp et al.

(10) Patent No.: US 6,369,759 B1
(45) Date of Patent: Apr. 9, 2002

(54) RECTENNA FOR HIGH-VOLTAGE APPLICATIONS

(75) Inventors: Larry W. Epp; Abdur R. Khan, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/591,184

(22) Filed: Jun. 8, 2000

Related U.S. Application Data
(60) Provisional application No. 60/138,302, filed on Jun. 9, 1999.

(51) Int. Cl.[7] .................................................. H01Q 1/38
(52) U.S. Cl. .............................. 343/700 MS; 343/824
(58) Field of Search .................... 343/700 MS, 824, 343/846, 893, 848, 841

(56) References Cited

U.S. PATENT DOCUMENTS 5,907,305 A * 5/1999 Epp et al. ............ 343/700 MS
6,054,953 A * 4/2000 Lindmark ............ 343/700 MS

* cited by examiner

Primary Examiner—Don Wong
Assistant Examiner—James Clinger
(74) Attorney, Agent, or Firm—Fish & Richardson P.C.

(57) ABSTRACT

An energy transfer system is disclosed. The system includes patch elements, shielding layers, and energy rectifying circuits. The patch elements receive and couple radio frequency energy. The shielding layer includes at least one opening that allows radio frequency energy to pass through. The openings are formed and positioned to receive the radio frequency energy and to minimize any re-radiating back toward the source of energy. The energy rectifying circuit includes a circuit for rectifying the radio frequency energy into dc energy. A plurality of energy rectifying circuits is arranged in an array to provide a sum of dc energy generated by the energy rectifying circuit.

18 Claims, 12 Drawing Sheets

| | Vf1 (V) | Vf2 (V) | Vf3 (V) | Ir1 (A) | Ct (pF) | Vb (V) | Rs1 (Ω) | Rs2 (Ω) |
|---|---|---|---|---|---|---|---|---|
| Stimulus | .01mA | .10mA | 1.0mA | 1.0V | 0.0V | .01mA | 4.5-5.5mA | 9.5-10.5mA |
| Model | .517 | .611 | .710 | 3.0E-11 | .229 | 9.6 | 15.5 | 11.5 |

Simulation data for M/A-Com 40401 Schottky diodes.

FIG. 5

| | Vf1 (V) | Vf2 (V) | Vf3 (V) | Ir1 (A) | Ct (pF) | Vb (V) | Rs1 (Ω) | Rs2 (Ω) |
|---|---|---|---|---|---|---|---|---|
| Stimulus | .01mA | .10mA | 1.0mA | 1.0V | 0.0V | .01mA | 4.5-5.5mA | 9.5-10.5mA |
| Diode#1 | .566 | .635 | .714 | 2.8E-11 | .264 | 8.18 | 15.2 | 11.2 |
| Diode#2 | .570 | .541 | .726 | 7.5E-11 | .228 | 9.36 | 20.8 | 13.6 |
| Diode#3 | .549 | .618 | .698 | 4.5E-11 | .267 | 7.55 | 14.4 | 11.2 |
| Diode#4 | .556 | .626 | .706 | 3.1E-11 | .204 | 7.97 | 15.6 | 9.2 |
| Diode#5 | .568 | .636 | .718 | 3.5E-11 | .266 | 8.28 | 15.6 | 12.0 |

Measured data for M/A-Com 40401 Schottky diodes.

FIG. 6

| Frequency, GHz | Board # | Incident Power, W | Reflected Power, W | Load Resistance, Ω | DC Output Voltage | Rectification Efficiency | Overall Efficiency |
|---|---|---|---|---|---|---|---|
| 8.51 | 1 | 0.106 | 0.024 | 250 | 3.49 | 59.6 | 45.9 |
| 8.51 | 1 | 0.086 | 0.026 | 325 | 3.36 | 58.3 | 40.6 |
| 8.51 | 2 | 0.094 | 0.000 | 250 | 3.81 | 62.0 | 61.8 |
| 8.51 | 2 | 0.090 | 0.002 | 325 | 4.23 | 62.2 | 61.1 |
| 8.51 | 3 | 0.086 | 0.013 | 250 | 3.39 | 63.2 | 53.5 |
| 8.51 | 3 | 0.100 | 0.021 | 325 | 3.93 | 60.5 | 47.8 |

FIG. 7

Typical unit cell results for vertical polarization circuit.

| Frequency, GHz | Board # | Incident Power, W | Reflected Power, W | Load Resistance, Ω | DC Output Voltage | Rectification Efficiency | Overall Efficiency |
|---|---|---|---|---|---|---|---|
| 8.51 | 1 | 0.104 | 0.001 | 250 | 4.01 | 62.5 | 62.1 |
| 8.51 | 1 | 0.100 | 0.000 | 325 | 4.42 | 60.1 | 60.1 |
| 8.51 | 2 | 0.098 | 0.002 | 250 | 3.8 | 60.1 | 58.9 |
| 8.51 | 2 | 0.091 | 0.000 | 325 | 4.17 | 59.2 | 59.0 |
| 8.51 | 3 | 0.086 | 0.004 | 250 | 3.53 | 61.3 | 58.1 |
| 8.51 | 3 | 0.078 | 0.009 | 325 | 3.84 | 61.1 | 54.0 |

FIG. 8

Typical unit cell results for horizontal polarization circuit.

RECTENNA FOR HIGH-VOLTAGE APPLICATIONS

CROSS-REFERENCE TO RELATED APPLICATION

This application claims benefit of the priority of U.S. Provisional Application Serial No. 60/138,302, filed Jun. 9, 1999, and entitled Compact, Dual-Polarized 8.51 GHz Rectenna for High Voltage (50 V) Actuator Applications.

ORIGIN OF INVENTION

The invention described herein was made in the performance of work under a NASA contract, and is subject to the provisions of Public Law 96-517 (35 USC 202) in which the Contractor has elected to retain title.

U.S. Government may have certain rights in this invention pursuant to NASA contract number NAS7-1407.

BACKGROUND

The present disclosure generally relates to antennas that convert RF power to DC power, and specifically to designs of such antennas used in high-voltage applications.

A rectenna is a special antenna that captures and converts RF or microwave power to DC power. The rectenna may be used as the receiving terminal of a power transmission system. In this configuration, the terminal may deliver DC power to a load where physical transmission lines are not feasible. The power delivery may be through free space. The rectenna may also be useful in applications where DC power needs to be distributed to a large number of load elements that are distributed spatially. The power distribution is achieved by the dispersive nature of microwave energy in space. The dispersion may substantially reduce the need for physical interconnects to individual load elements. The rectenna may use the dispersive nature of the microwave power to combine the power from many elements, which are spatially separated by the element spacing of the array or panel. Therefore, the effective area of the entire rectenna panel determines the total power received by the panel.

An application for rectennas may involve the transmission of power to actuators. For example, the actuators may control the position of individual surfaces of a spacecraft-mounted optical reflector. The use of rectennas may simplify the design of the multi-surface reflector by eliminating the need for a wiring harness to distribute power to the individual actuators. Further, the rectennas may also have associated circuitry to provide control signals to each actuator by proper modulation of the incident microwave beam. However, the actuators often require high voltage for operation. For example, the high voltage may be on the order of about 50 volts.

SUMMARY

The present disclosure defines an energy transfer system that includes patch elements, shielding layers, and energy rectifying circuits. The patch elements are arranged to face a source of radio frequency energy. Each of the patch elements has a first surface facing the source of energy, and a second surface opposite the first surface and facing away from the source of energy.

Each shielding layer is located facing the second surface, such that each of the patch elements is coupled between the source of energy and the shielding layer. The shielding layer includes at least one opening that allows radio frequency energy to pass through to a second side thereof. The openings are formed and positioned to receive the radio frequency energy and to minimize any re-radiating back toward the source of energy.

The energy rectifying circuit includes a circuit for rectifying the radio frequency energy into dc energy. At least a part of the energy rectifying circuit is on the second side of the shielding layer. The circuit is separated from the source of energy by the shielding layer. The energy rectifying circuits are arranged in an array to provide a sum of dc energy generated by the energy rectifying circuit.

The present disclosure also defines a method of receiving and transducing energy. The method includes separating a first part of the energy having a first characteristic, from a second part of the energy having a second characteristic, coupling the first part of the energy to a first circuit portion of an energy receiving board, and coupling the second part of the energy to a second circuit portion of the energy receiving board. The second circuit portion is spaced apart from the first circuit portion. The method further includes appropriately coupling energy receiving boards to add energy received by each energy receiving board.

BRIEF DESCRIPTION OF THE DRAWINGS

Different aspects of the disclosure will be described in reference to the accompanying drawings wherein:

FIG. 5 shows DC performance simulation data for M/A-Com 40401 Schottky diodes;

FIG. 6 shows measured data for M/A-Com 40401 Schottky diodes;

FIG. 7 shows performance results of a typical vertical polarization circuit in microstrip patch antenna panels;

FIG. 8 shows performance results of a typical horizontal polarization circuit in microstrip patch antenna panels;

DETAILED DESCRIPTION

The individual rectennas may be designed to provide the high voltage in an efficient manner. Trade-offs include physical rectenna size, diode availability, and diode characteristics including breakdown voltage and power handling. Trade-offs also include efficiency of capturing the microwave energy by the antenna, efficiency of the rectification process, and frequency of the incident power. These parameters may also be dependent on each other. In one embodiment, the frequency of the incident microwave power was chosen to be 8.51 GHz. However, it should be understood that while this design of 8.51 GHz was based on the RF sources available at the time, it may easily be adapted to different frequencies.

Previous rectenna designs have employed dipole antennas and received a single linear polarization. A thin-film, printed-circuit dipole rectenna design allowed simple DC removal. This single polarization design has minimized the thermal path between the diodes and the outer surface. However, the printed capacitors of these thin-film designs have restricted tunability of the capacitors.

For dual polarization, the extension of the thin film dipole design may encounter substantial obstacles to successful implementation. A separate layer may be required for each polarization. Electromagnetic interaction between the DC collection lines, parallel to the dipole on the orthogonal layer, may compromise the rectenna performance. Further, having one dipole layer "buried" beneath the other may also present thermal problems.

The fabrication process of the dual linear dipole design may be challenging since diodes and chip capacitors may be potentially buried between layers of foam and/or polyimide film. The dipole rectenna designs may also present disadvantageously couple the feed circuitry to the dipole antenna. The twin lead transmission line impedance may be related to the dipole impedance, thereby posing a constraint on the design. Also, the feed circuitry may be exposed to the outside world. The parasitic radiation from the feed lines including harmonic radiation may present difficulties. The harmonic radiation may be generated by the diodes.

The inventors recognized that for dual-polarization needs, a microstrip patch design may alleviate many of the difficulties mentioned above. Advantages of dual-polarization include doubling the receive power per element area, and making the rectenna capable of receiving either dual linear or a single circular polarization. The latter ability to receive circular polarization makes the rectenna panel suitable for applications such as circling airplane or space-born platforms including a space-born optical reflector.

Figure 1:
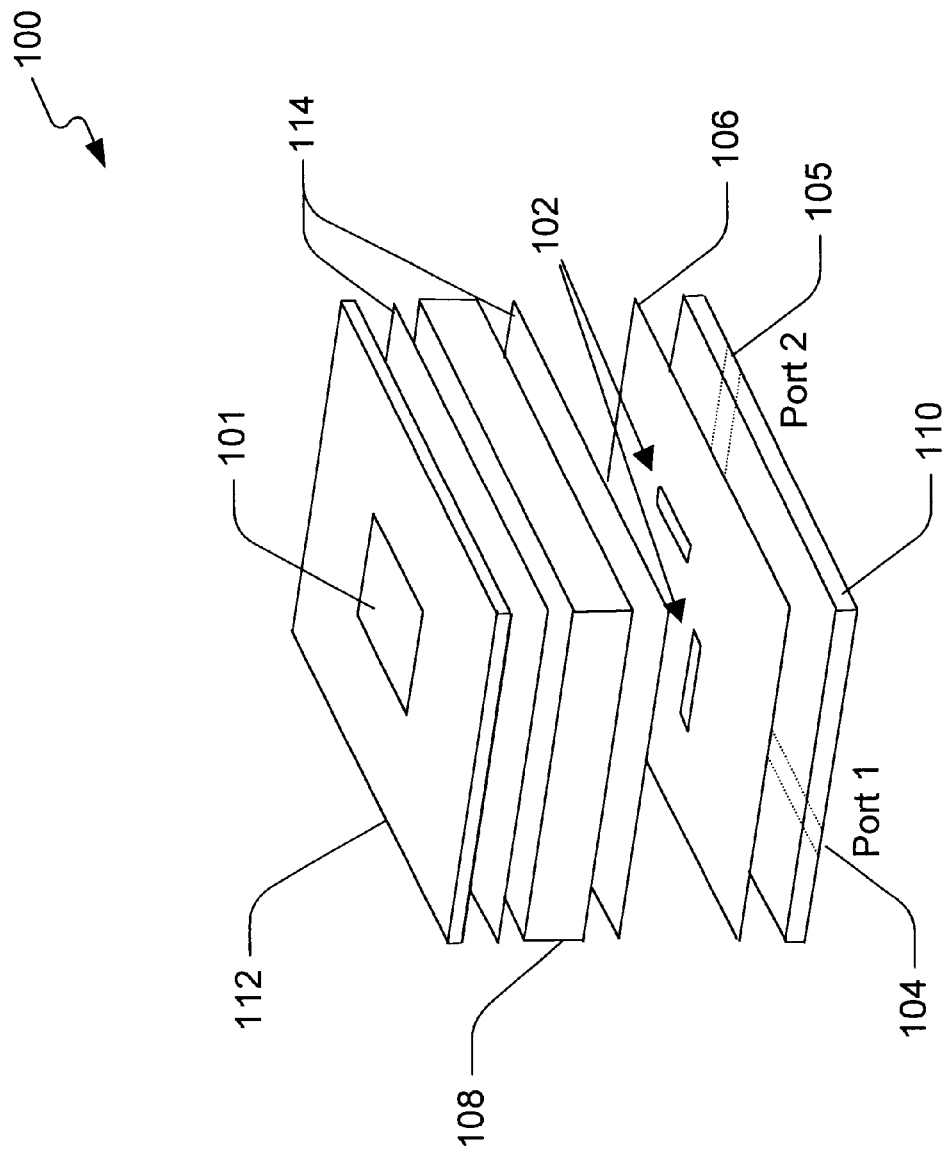
FIG. 1 shows panel construction of a microstrip patch antenna according to an embodiment.

An aperture-coupled microstrip patch 101 relies on an aperture, or coupling slot 102, to couple electromagnetic energy from a feed circuit 104, 105 to the microstrip patch antenna 101, as is shown in FIG. 1. In this configuration, the antenna 101 and the microstrip feed circuit 104, 105 are isolated from one another. This may also allow the diode circuitry to be located behind the ground plane 106 containing the coupling apertures 102. The ground plane 106 separates the patch antenna 101 and the feed circuit 104, 105, 106. This ground plane 106 may protect the feed circuitry 104, 105 from the incident RF energy. As a result, the incident RF energy may not be coupled to the DC lines that collect the output power. The ground plane 106 may also reduce the harmonics from radiating back towards the incident wave. The harmonics are generated by the diodes. A microstrip line filter may be used to prevent radiation back through the aperture feed 104, 105.

As shown in FIG. 1, the patch antenna 101 may be supported above the ground plane 106 by a lightweight foam support 108. In this embodiment, the foam 108 has a relative dielectric constant of 1.07. The foam 108 may reduce the possibility of surface wave modes that may limit the microstrip patch array performance. The ground plane 106 may provide a thermal sink for the diodes with via connections to the ground plane 106.

In the illustrated embodiment of FIG. 1, the microstrip patch antennas 100 includes Rohacell® 51 ($\epsilon_r$=1.07), as a foam spacer 108 and RT/Duroid® 5880 ($\epsilon_r$=2.2) as a microwave substrate 110. The microwave substrate 110 may be about 0.64 mm thick and have a copper thickness of about 17.5 $\mu$m. The patch antenna 100 may also include Sheldahl's Novaclad® G2200 as a copper clad polyimide film 112 ($\epsilon_r$=3.3), on which the microstrip patch antenna 101 may be etched. In this embodiment, the polyimide film 112 is 50 $\mu$m thick and has a copper thickness of 35 $\mu$m. For every 25 $\mu$m change in the foam spacer's thickness, a 10 MHz change in resonant frequency may occur. To insure accurate thickness of the foam used, the thickness of the Rohacell® may be pre-compressed to about 0.89 mm by using a compression fixture and an oven. A piece of about 1.02 mm thick Rohacell® foam may be placed in a compression fixture. The entire assembly may then be placed inside an oven that is heated above 191° C. At this temperature, the Rohacell® may lose its compressive strength. The use of about 0.89 mm shims may determine the final thickness.

Typical solder reflow temperatures may be above 205° C.; and the Rohacell® may begin to expand at 191° C. Therefore, if the Rohacell® is bonded to the RT/Duroid® prior to the solder reflow process and then exposed to the solder reflow, the foam may distort. The distortion of the foam may destroy the rectenna panel. An alternative solution may include using a room temperature vulcanizing silicone rubber adhesive 114, such as Dow Corning® 3140 RTV. Using the 3140 RTV Coating enables components to be wave soldered to the RT/Duroid®. The RT/Duroid® may then be bonded to the Rohacell foam. The fabrication process may apply a uniform coat of adhesive, thereby insuring repeatability in the fabrication process.

Figure 2A:
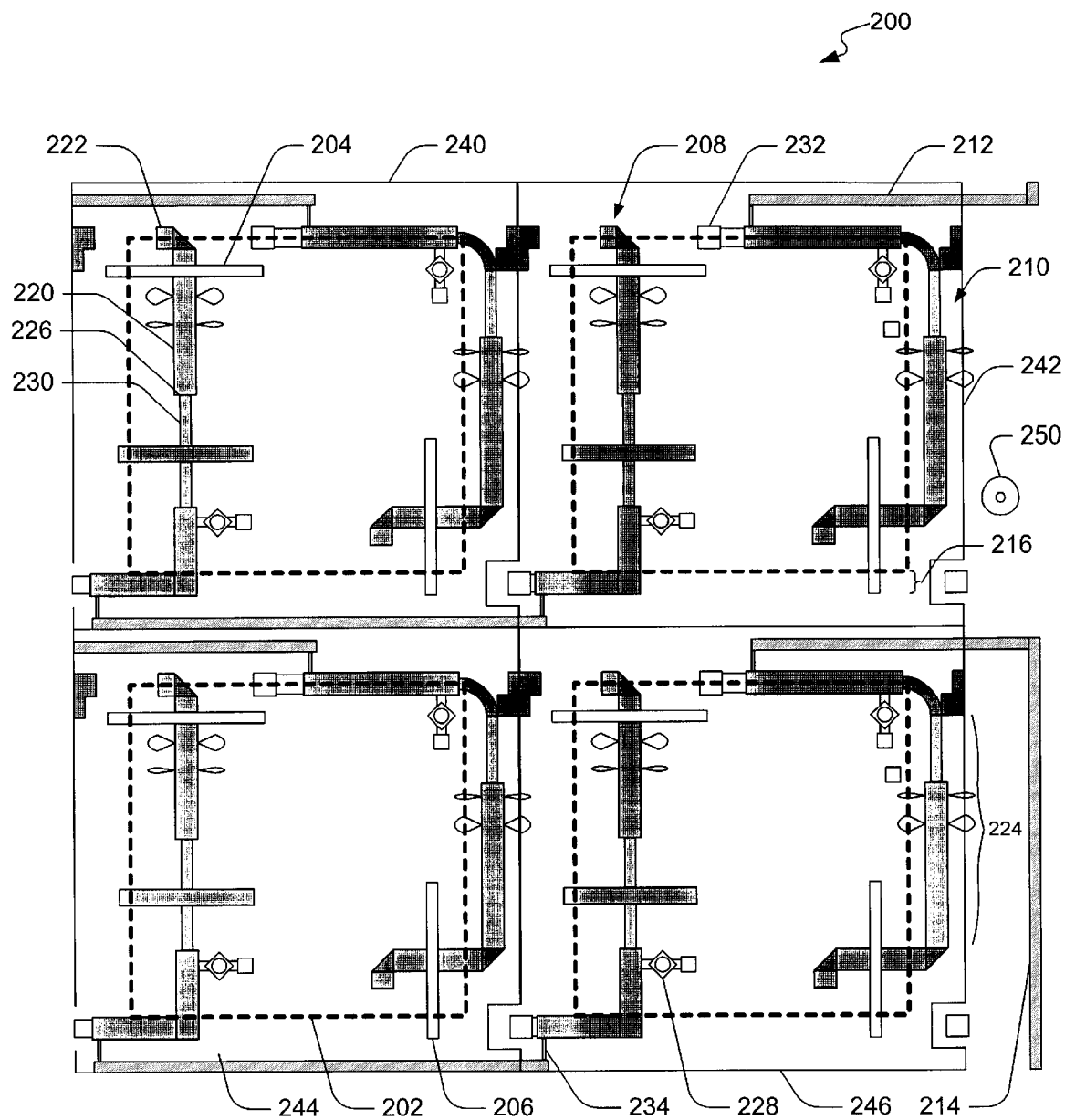
FIG. 2A shows a microstrip rectifying circuit structure layout in accordance with an embodiment.

FIG. 2A shows a layout of the microstrip rectifying circuitry structure 200 according to an embodiment. However, it should be understood that the circuitry carrying out this function could easily be replaced by any other well-known circuitry. The structure 200 includes the physical relationship between the circuitry, patch 202 and slots 204, 206. Slot 204 overlies a first diode rectifying circuit 208. Slot 206 overlies the other diode rectifying circuit 210. In the illustrated embodiment, the term "overlies" refers to a hypothetical plane that is perpendicular to the plane of the layers and hence parallel to the direction of incident microwave radiation. This plane may pass through both the slot and the circuit portions. The design may be configured to use slots that preferably receive information from different energy polarization components.

The patch used can be of a rectangular, circular, oval, or elliptical shape. For a single polarization, the slot is located down the center of the patch in an aperture-coupled patch system. The patch often completely overlays the entire slot. However, the slot and the patch may be placed relative to each other in such a way that allows at least one of the slots 204, 206 to slightly overhang the edges of the patch. This implementation of the aperture-coupled patch may be used for this rectenna. The slight overhang can constitute 10 to 20 percent of the length of the slot. This leaves a portion 216 of slot 206 overhanging the area of the patch 202.

The energy may be coupled through slot 204 to microstrip feeder line 220. Microstrip feeder 220 includes element 222 which terminates the microstrip feeder to change its impedance and thereby obtain a better coupling action. Additional filter and impedance transformation elements 224 may further process the signal to provide further filtering thereon, and to impedance transform for better operation. In this embodiment, the low pass filtering operation filters the system to include signals of frequency less than 8.51 GHz.

A step area 226 may also be provided for additional matching. This additional matching may also facilitate impedance matching relative to diode 228. The RF energy passes via microstrip waveguide 230 to diode 228, which rectifies the RF to provide a DC signal near the area 230. The diode 228 may also provide more matching to the capacitor area 232 that provides the additional DC conversion. The final DC-converted signal at 234 may be coupled to DC bus 212 or 214. The DC bus 212 or 214 may be connected between the various patches to connect all of the DC from all the patches combined to their final destination. Each of the bus lines 212, 214 is connected to a plurality of the circuit elements 208, 210 through the diodes by using an isolated ground plane under each element.

The patch rectenna may be implemented using standard microstrip lines. The use of a minimum number of stubs for the input filter/matching section 224 may enable the patch size to be decreased. The line lengths may also be made as short as possible to minimize the RF losses. The corresponding microstrip implementation of the vertical 208 and the horizontal 210 polarization circuits is shown in FIG. 2A. The stepped line impedance 230 and chip capacitor 232 may perform the final steps of bandpass filtering and matching.

Figure 2B:
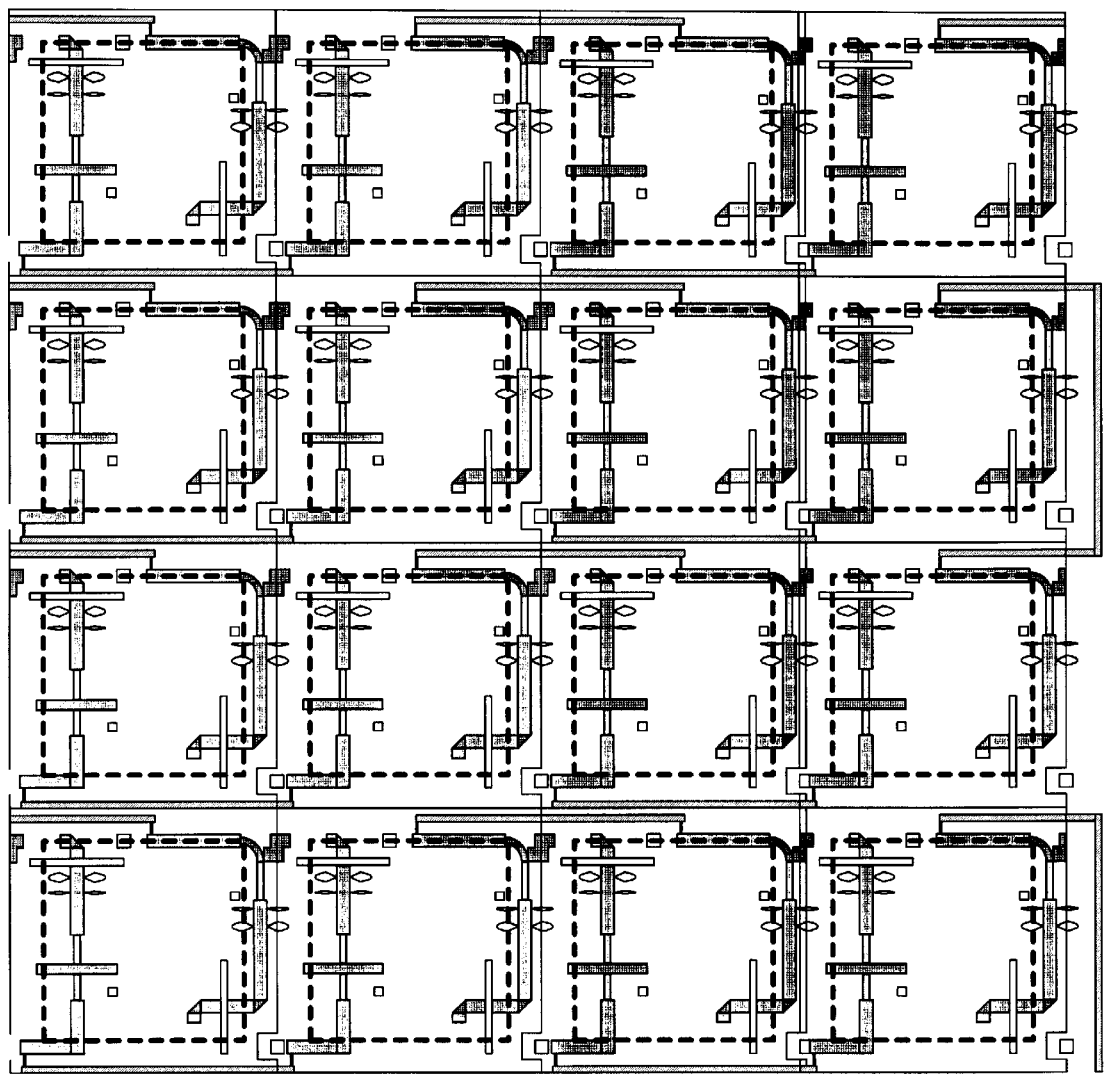
FIG. 2B illustrates an array of rectennas extended to fill a large panel in accordance with an embodiment.

FIG. 2B illustrates an array of rectennas extended to fill a large panel. Each rectenna design is similar to the above design described in connection with FIG. 2A.

Figure 3:
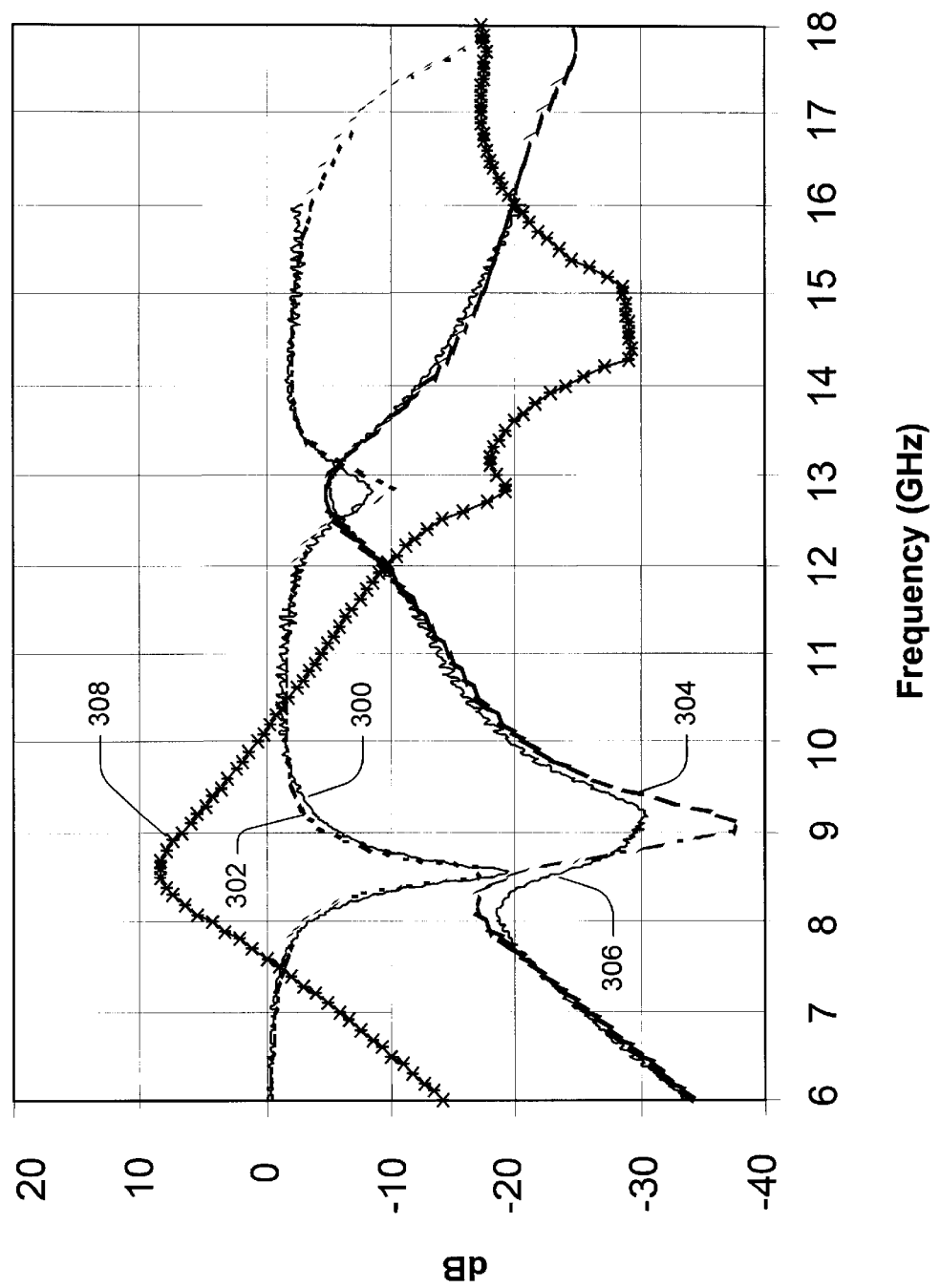
FIG. 3 shows a plot of scattering parameter data for a microstrip patch antenna.
Figure 4:
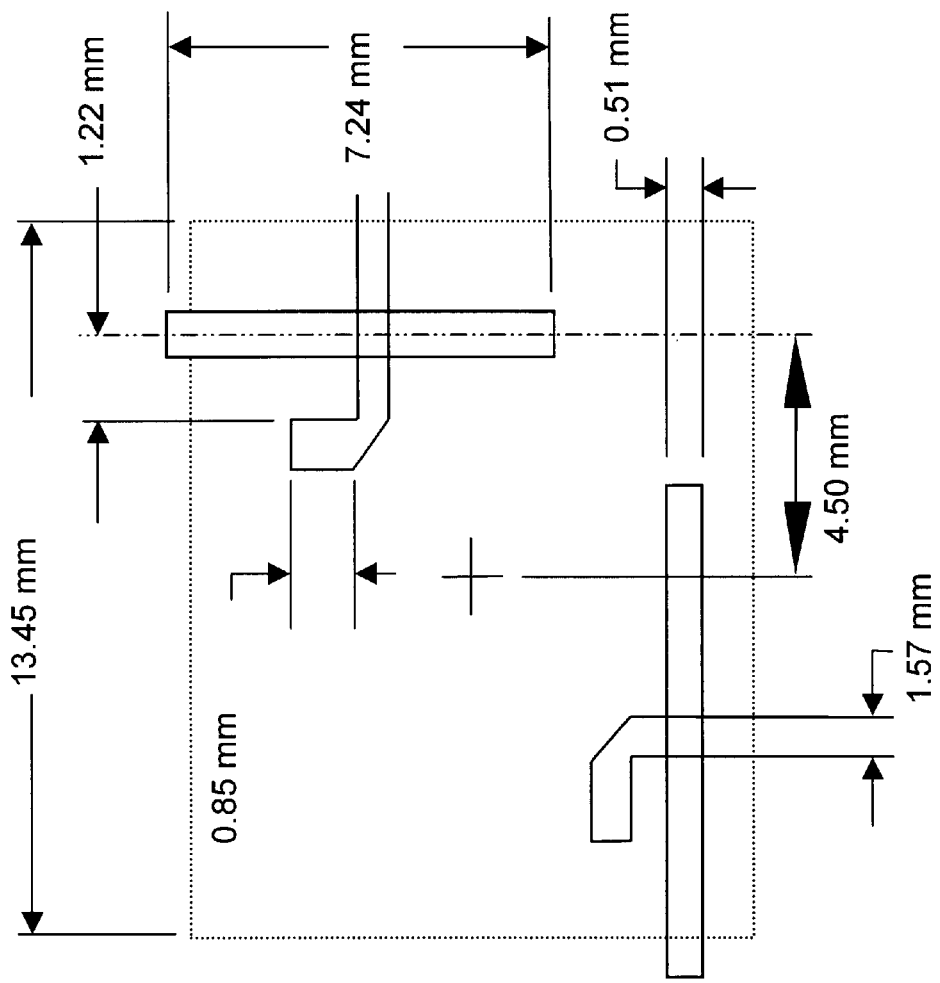
FIG. 4 shows patch dimensions for a microstrip patch antenna.

The above microstrip patch design is configured to provide a low return loss at approximately 8.51 GHz. The return loss for each port 104, 105 is designated as $S_{11}$ and $S_{22}$, respectively. Further, the patch design enables an effective isolation between the two ports 104, 105 to provide low $S_{21}$ and $S_{12}$. The scattering parameter data and patch dimensions are shown in FIGS. 3 and 4. The measured return loss ($S_{11}$) 300 in FIG. 3 is shown to exceed −18 dB at approximately 8.51 GHz. Only port 1 is shown due to symmetry. The simulated return loss 302 is also shown.

The measured resonance frequency, for optimum return loss, was about 8.565 GHz. The simulations indicate a worst case coupling 304 between the two ports greater than −20 dB. Actual measurements were somewhat greater than this value. Measurements show a worst case coupling 306 between ports of −18.5 dB (at about 8.07 GHz) for all frequencies below 10 GHz. To correct for the foam compression, the relative permittivity was increased by the ratio of compressed to uncompressed height to $\epsilon_r$=1.2.

FIG. 3 also shows the predicted gain and scattering parameters up to 18 GHz. This allows the simulated parameters to be shown at the first harmonic of the operating frequency at 17.02 GHz. The measured results stop at 16 GHz where the microstrip line becomes over-moded. The predicted patch gain 308 at 8.51 GHz is 8.4 dB. At the second harmonic frequency the gain 308 is less than −17 dB, indicating that the harmonic radiation is not radiated back through the coupling aperture and towards the signal source. The additional low pass filter, discussed below, provides further suppression of unwanted harmonic radiation.

Most rectenna designs have used a single diode in a clamping circuit configuration rather than a traditional multiple-diode rectifying circuit. At microwave frequencies, these rectenna circuits are substantially nonlinear and difficult to design based upon purely analytic equations.

Since optimal performance of a rectifier requires ideal tuning at harmonics as well as the fundamental frequency, parameters of any diode model must be known at the harmonic frequencies as well as at the fundamental frequency. Experimental large signal measurements provide a method of extracting and verifying diode models and of searching for maximum efficiency.

For the purposes of the present disclosure, diodes readily available in a packaged format with large breakdown may be chosen. In one embodiment, the commercially available M/A-Com 40401 Schottky diode in package model 213 is used. The rectification efficiency may be defined as $$\eta_r = \frac{P_{DC}}{P_{inc} - P_{ref}}, \quad (1)$$

where $P_{DC}$ is the DC output power, $P_{inc}$ is the incident RF power, and $P_{ref}$ is the reflected RF power. Overall efficiency may then be defined by $$\eta_{ov} = \frac{P_{DC}}{P_{inc}}. \quad (2)$$

Measurement results at the design frequency of 8.51 GHz indicates a maximum overall efficiency of 66% with 65 mW of DC output power, and over 100 mW DC output power for a lower efficiency of 62%. This diode exhibits a higher output voltage and higher efficiency than a similar diode by another manufacturer. The output voltage increased from 3.2 V to 4.1 V at the lower efficiency of 62%, indicative of the trade-off between maximum output voltage and efficiency expected. The large output voltage of 4.1 V may allow for maximum output voltage if a suitable combination method is used.

The diode is often the most critical component in the rectenna element. Many aspects of performance of the rectenna may depend primarily on the diode parameters. The series resistance, for example, may directly limit efficiency through the $I^2R$ loss. The junction capacitance, together with package capacitance and lead inductance, may affect how harmonic currents oscillate through the diode. The breakdown voltage may limit the power handling capability of each rectifying circuit. These parameters may also affect the match of the circuit. Since the diode, as a power-rectifying element, operate in a large signal environment, the diode model may need to be valid for a wide range of biasing. Since high efficiency requires proper termination of harmonic frequencies, the model may also need to be valid over a wide frequency range.

The simulation data for the DC performance is shown in FIG. 5. The voltage, current, and resistance data were taken from the IV curve, and the total capacitance was measured by resonating the diode with a series inductor. The simulation data shows that the diode model agrees well with the measured data shown in FIG. 6. The breakdown voltage was selected to be slightly higher since it was possible to select diodes, with breakdown around 9.5 V.

The parameters Vf1, Vf2, and Vf3 represent the forward voltages of the selected diode for the current stimuli of 0.01 mA, 0.1 mA, and 1.0 mA, respectively. The parameter Ir1 is the reverse current for the voltage stimulus of 1.0 V. The parameter Ct is the total capacitance. Vb is the breakdown voltage. Rs1 and Rs2 represent the series resistance when the currents are as listed.

In some embodiments, measurements of the unit cells 240–246 shown in FIG. 2A may be formed without the microstrip patch and DC collection to the next unit cell(s). The device under test (DUT) may include a single unit cell 240, 242, 244, or 246 with a circuit for horizontal polarization 210 and a circuit for vertical polarization 208 in the same layout, as they would appear in an array. In other embodiments, the input microstrip lines may be extended to the edge of the substrate to coaxial connectors. DC output may be picked off the circuit by soldering a single-strand wire directly to the DC bus line 212, 214. A decade box may be used as the load.

Several unit cells were fabricated and measured. FIGS. 7 and 8 show the measured results for three different boards. The rectification efficiency of all circuits remained close to the design overall efficiency of 60%, with high overall efficiency when reflected power was minimized. The average output voltage of the horizontal polarization circuits was 4.14 V at an average overall efficiency of 57.7% when using a load resistance of 325 Ω. This desirable result meets the maximum output voltage from the diode measurements.

The average output voltage of the vertical polarization circuits was lower, 3.84 V, at an average efficiency of 49.8% with a load resistance of 325 Ω. The trade-off of the higher output voltage for efficiency is indicated by the lower average output voltage of 3.56 V for the higher average efficiency, 53.7%, when a load resistance of 250 Ω is used. Higher sensitivity to variations in component assembly may have contributed to the lower average overall efficiency for the vertical polarization circuits.

Rectenna panels with a 3 by 3 arrangement of unit cells may be fabricated using the above-described design. Since the average output voltage of the circuits is 4 V, the series connection of 13 circuits may satisfy the design goal of 50 V. Since each patch provides two circuits, one for vertical polarization and another for horizontal polarization, the minimum number of cells required is 7 patch elements. Choosing the minimal square array containing at least 7 patches leads to an array of 3 elements by 3 elements, for 9 total patch elements.

The effective area of a single patch element is given by, $$A_p = G_p \frac{\lambda^2}{4\pi}, \quad (3)$$

Where $G_p$ is the gain of the patch, or 8.4 dB at 8.51 GHz. The effective area for a single patch, before placement in the array, is therefore 6.8 cm² from equation (3). In order for the array to absorb substantial portion of the incident power, it may be necessary for the unit cell area be less than 6.8 cm². For rectangular spacing, a minimal cell-to-cell spacing of 2.62 cm may be required. Accordingly, a more dense cell-to-cell spacing of 1.97 cm may be used to further shrink the overall panel size while still leaving sufficient room for the panel circuitry.

During the diode and unit cell measurements, the overall efficiency may be defined to be the total DC output power at the load in proportion to the incident power. Thus any power that is reflected by the circuitry may not be converted into DC power and may decrease the overall efficiency. Likewise in the panel measurement, overall efficiency may be defined such that any reflected power from the panel lowers the overall efficiency. One method of computing overall efficiency for a rectenna panel may be to use the effective area of the panel.

Using the effective area of the panel, the received power is given by, $$P_{recv} = \frac{P_{trans} G_{trans} A^{eff}}{4\pi R^2}, \quad (4)$$

where $A^{eff}$ represents the maximum effective area of the panel as the sum of the maximum effective area of each patch in the array configuration. Thus it may be seen that for rectenna panel applications it is desirable for the maximum effective area of the panel to exceed the physical area of the panel. The maximum effective area of each patch should be measured in the array configuration under matched conditions, i.e. with no reflection, when mutual coupling is present.

If the overall panel efficiency is then defined as, $$\eta_{ov} = \frac{P_{DC}}{P_{recv}} = \frac{4\pi R^2 P_{DC}}{P_{trans} G_{trans} A^{eff}}, \quad (5)$$

any power reflected from the rectenna panel will provide a decrease in the overall efficiency.

Figures 9A, 9B, 9C:
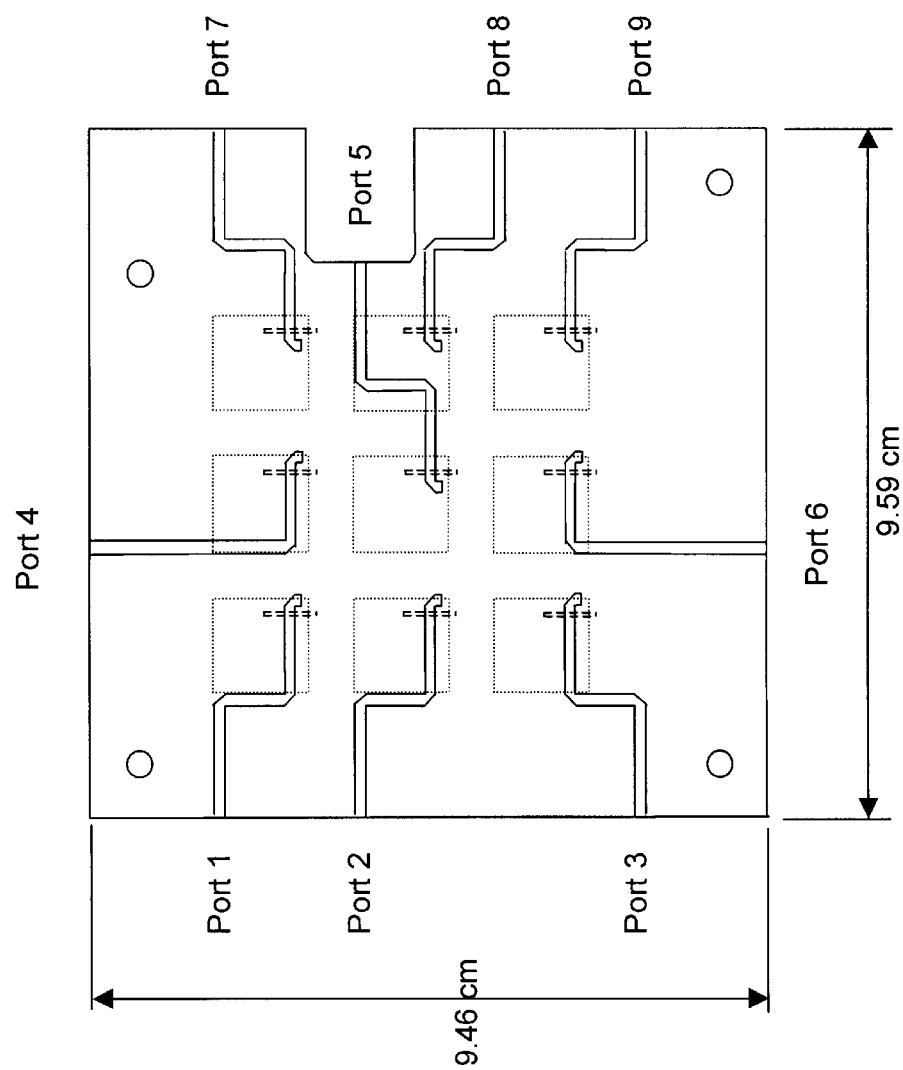
FIG. 9A illustrate a rectenna panel array layout in accordance with an embodiment.
FIGS. 9B and 9C tabulate results of effective area measurements for a rectenna panel array.

To properly compute the maximum effective area of each patch in the array configuration, a rectenna panel may be built where a microstrip line leading to a SMA connector replaces each rectenna circuitry as shown in FIG. 9A. Each port may be individually tuned until the return loss for all patches exceeds 21 dB with all other ports matched. Only one polarization may be measured and the panel may be is rotated for the orthogonal polarization because of the symmetry. Thus only one port is shown in FIG. 9A.

The line losses and connector losses may be removed by calibration standards for each of the two microstrip feed line configurations. To ensure accuracy of the effective area measurements for the tightly packed array, the mutual coupling between ports may be measured. In this configuration, the coupling was measured to be less than 17.5 dB for all ports. The low mutual coupling for this densely packed array may be attributed to the use of the low dielectric foam superstrate.

The results of the effective area measurements are shown in FIGS. 9B and 9C. Using symmetry to reduce measurement error, the effective area may be averaged between the two measurements representing the two orthogonal ports of each patch. The effective area of the center patch closely matches the unit cell area, as expected. Further, the effective area of the corner patches may be slightly larger than the unit cell area, since these patches are on the outside of the array.

In order to minimize the measurement discrepancies in the panel measurements that follow, the corner and center-edge effective area measurements may be averaged using a symmetry argument. The total effective area of the 3 by 3 panel may be about 1 cm more than the physical area of the panel, or 3% greater than the physical area. The physical area of the panel may be defined as nine times the unit cell area.

Figure 10:
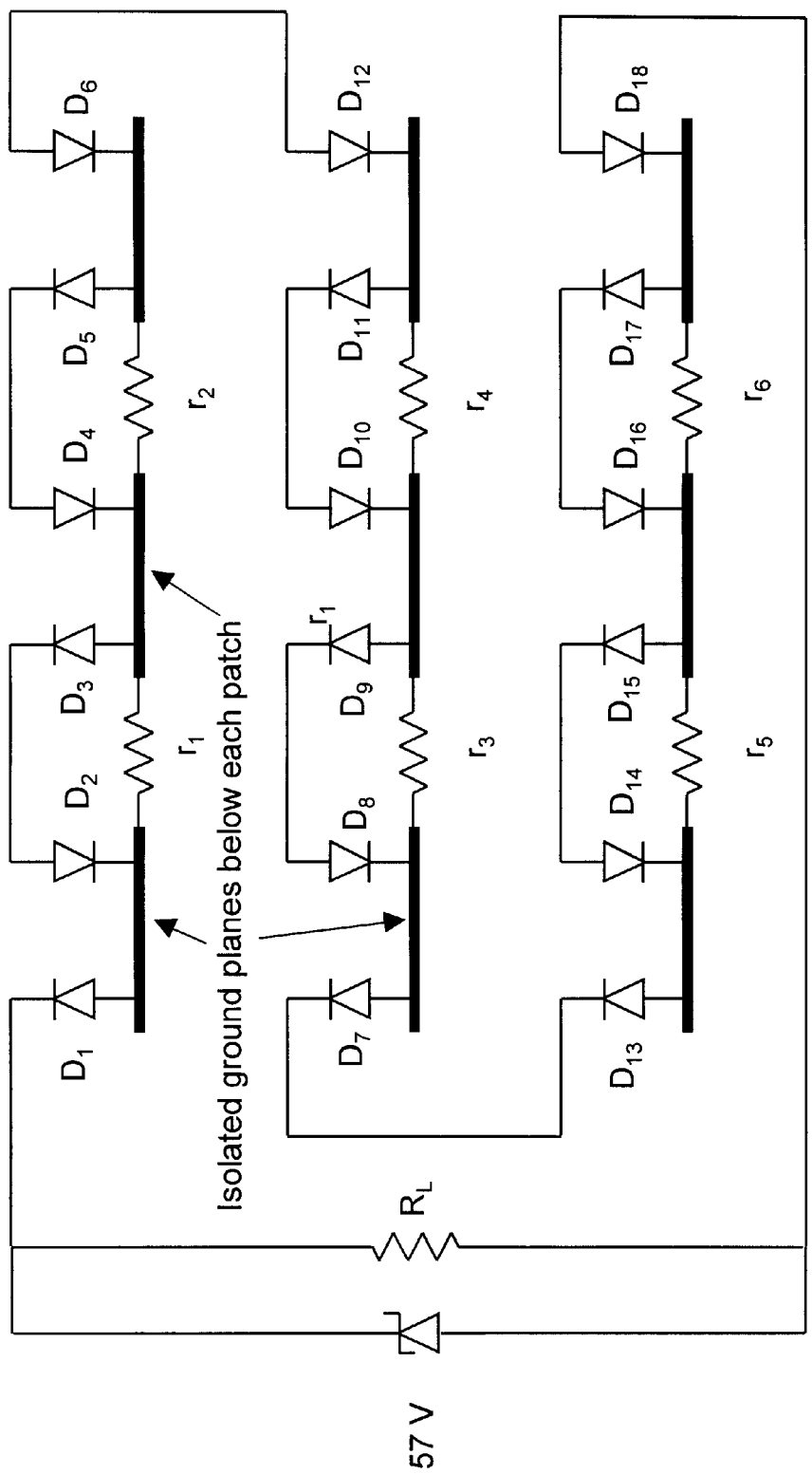
FIG. 10 is a simplified circuit diagram of a rectenna panel array according an embodiment.

A series combination of all individual rectenna circuits may be desired as shown in FIG. 10. The combination may maximize the output voltage of the panel. To achieve this combination, the ground plane around each individual patch may be DC isolated below each patch. The ground plane may contain the coupling apertures. The DC isolation may be provided by etching a square ring slot 250 (see FIG. 2A) in the ground plane below each individual patch. To ensure RF continuity of the ground plane, and therefore re-radiation of harmonics generated by the circuitry through these ground plane slots, a thin layer of copper-coated polyimide may be used to ensure capacitive coupling.

In the illustrated embodiment of FIG. 10, the diodes are installed in an opposing manner. This design may allow for a series output voltage for each patch. In order to properly reverse bias all diodes when power is applied, additional resistance $r_1$ through $r_6$ between the isolated ground planes may be needed. In this embodiment, the resistance value for each of the resistors $r_1$ through $r_6$ is chosen to be 1 MΩ. The additional resistance may also allow each isolated ground plane to discharge when power is removed, protecting the diodes. The series connection of diodes $D_1$ through $D_{18}$ provides desired high voltage by linking the voltage of each diode, which may represent a bank or plurality of diodes.

Figure 11:
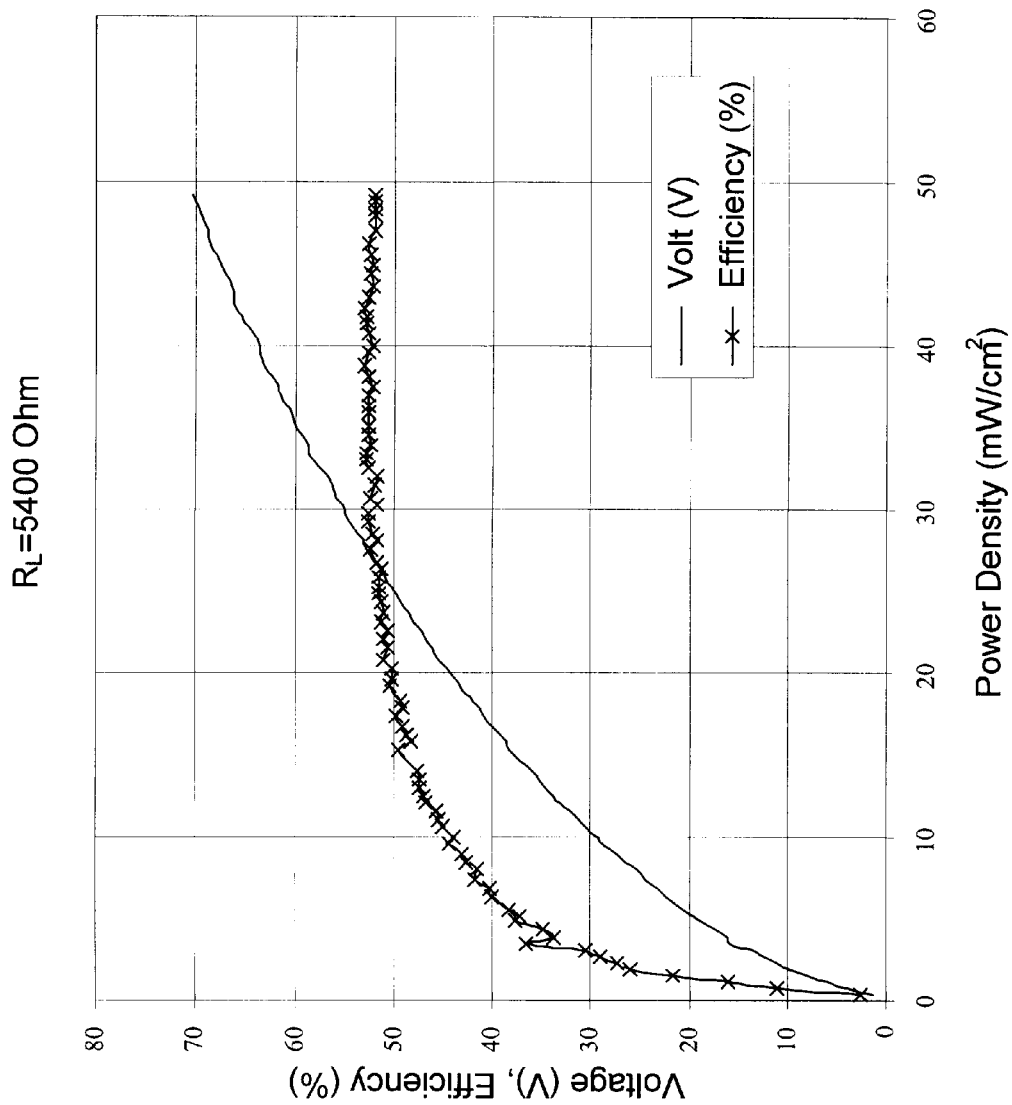
FIG. 11 shows measured results of the rectenna panel array when loaded for optimum overall efficiency with a load resistance of 5.4 KΩ.

FIG. 11 shows the measured results of the rectenna panel when loaded for optimum overall efficiency with a load resistance R (in FIG. 10) equal to 5.4 KΩ. The overall efficiency may be calculated using equation (5). The load resistance of the entire panel may be about 18 times the unit cell resistance. The series connection of the circuits on the panel may involve connecting slightly different circuits. Therefore, a starting load resistance of approximately 18 times 325 Ω or 5.85 KΩ may be close to giving optimal overall panel efficiency.

The overall panel efficiency exceeds 52% over a large region of input powers, with a peak of 53% at a receive power of 38.8 mW/cm². The desired output voltage of 50 V may be achieved for an input power density of 25.2 mW/cm². For the Narda 640 standard gain horn, this requires a transmit power of 13.6 W at a distance of 37.1 cm to provide 50 V of output power. To provide maximum efficiency, the panel may require not only sufficient loading, but also sufficient input power to place the diodes in an efficient region of operation. The peak overall panel efficiency is 4% less than the average efficiency of the horizontal polarization unit cell measurements and 1% less than the average vertical polarization unit cell efficiency (measured without the patch via microstrip line). This indicates that additional gains in efficiency are most likely to be obtained by optimization of the unit cell circuitry and not from further antenna optimization.

Figure 12:
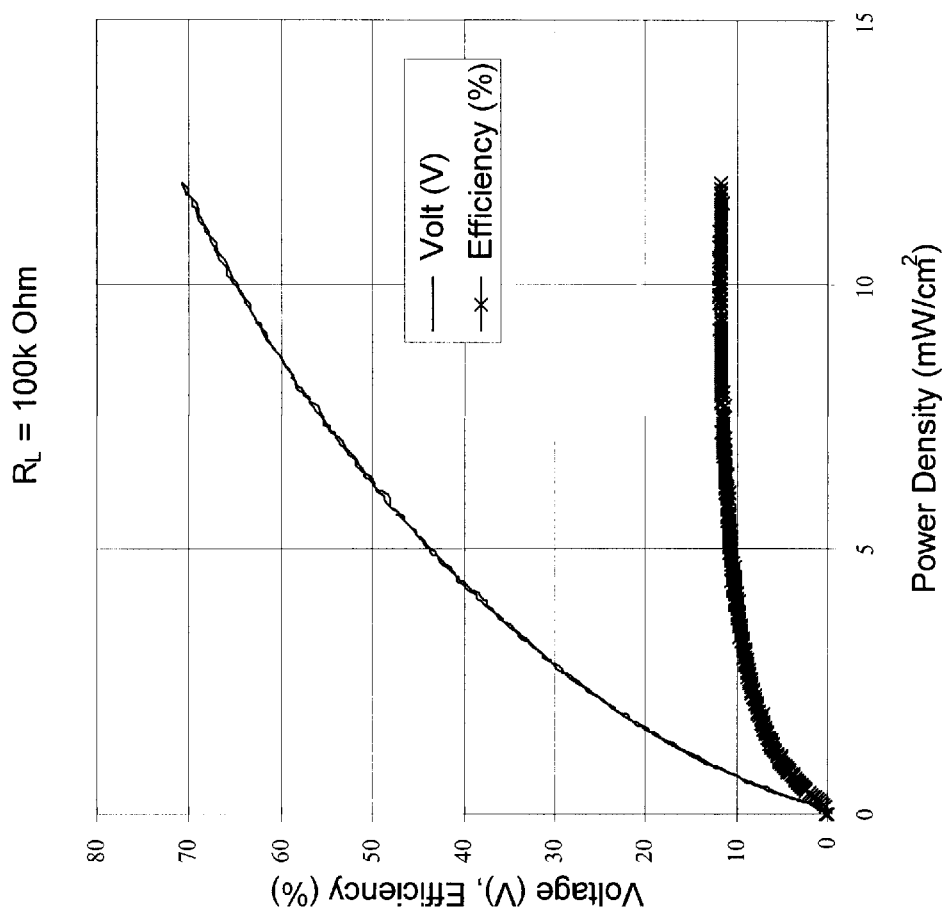
FIG. 12 shows measured results of the rectenna panel array with a load resistance of 1 MΩ.

FIG. 12 shows one embodiment of the present disclosure having a load resistance R (in FIG. 10) equal to 100 KΩ. By increasing the load resistance, the required 50 V output may be obtained for a lower incident power density of 6.3 mW/cm². This corresponds to only 3.4 W of transmit power at a distance of 37.1 cm.

Since the expected output voltage of 18 diodes in series could exceed the desired output voltage, a method of producing more than one 50 V output may be desired. By attaching commercially available boost regulator circuits it may be possible to obtain two 50 V outputs. The series output of 5 patches, or 10 circuits, may be used to drive one regulator and the remainder to drive the additional regulator. Therefore, the boost regulator circuits may lower the required incident power density even further.

Figure 13:
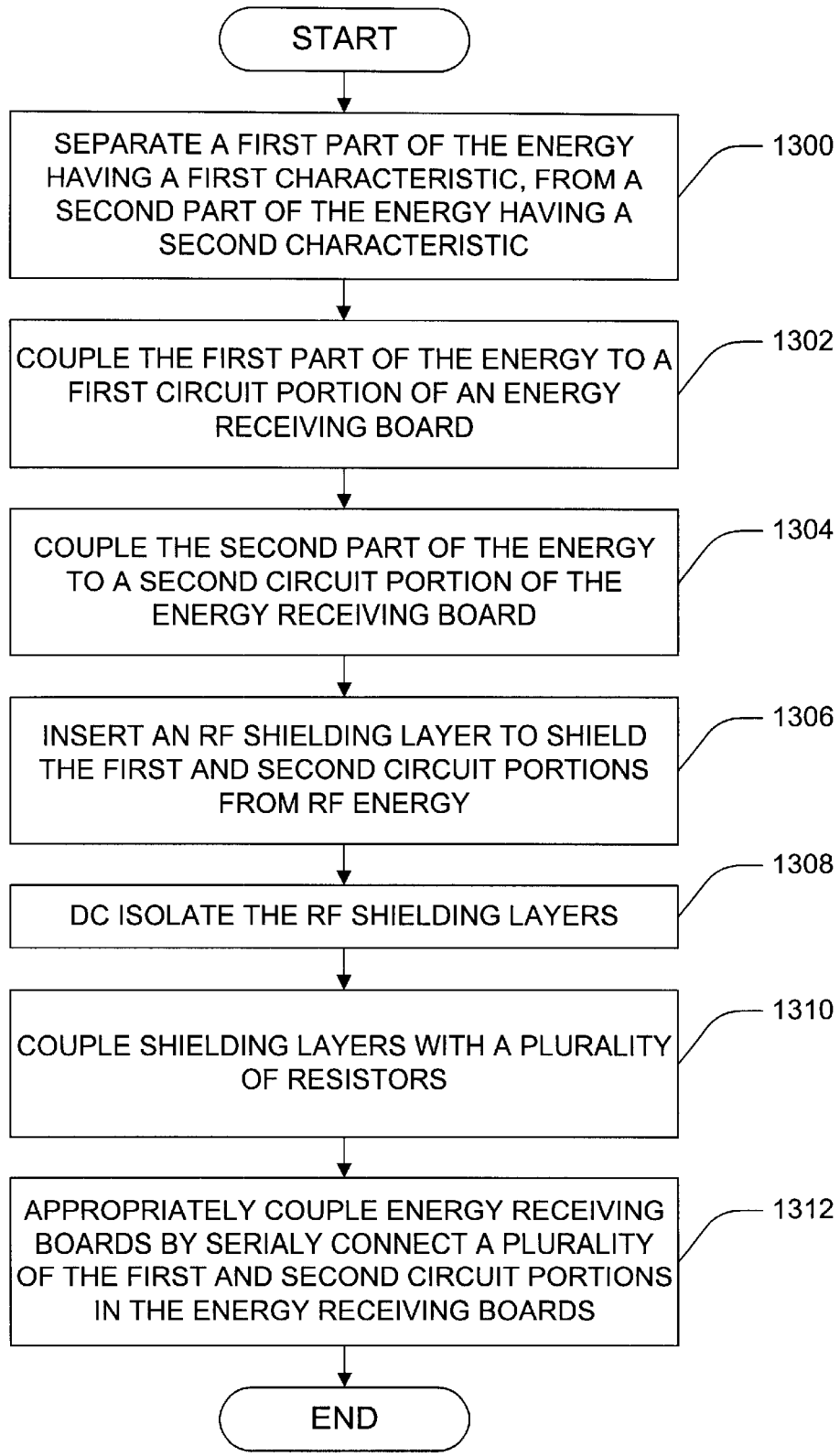
FIG. 13 is a flowchart of a method for receiving and transducing energy in accordance with an embodiment.

A flowchart of a method for receiving and transducing energy in accordance with an embodiment is shown in FIG. 13. At 1300, a first part of the energy having a first characteristic is separated from a second part of the energy having a second characteristic. The first part of the energy is coupled to a first circuit portion of an energy receiving board at 1302. The second part of the energy is coupled to a second circuit portion of the energy receiving board at 1304. The second circuit portion is spaced apart from the first circuit portion.

An RF shielding layer is inserted at 1306, to shield the first and second circuit portions from RF energy. The RF shielding layers are dc isolated at 1308, and coupled to each other with a plurality of resistors at 1310. The energy receiving boards are appropriately coupled at 1312. The boards are coupled by serially connecting a plurality of the first and second circuit portions in the energy receiving boards.

While specific embodiments of the invention have been illustrated and described, other embodiments and variations are possible. For example, even though the array panel size has been described in terms of a 3 by 3 array, array panels of different sizes may be used to achieve different voltage levels.

All these are intended to be encompassed by the following claims.

What is claimed is:

1. An energy transfer system, comprising:

antenna elements arranged to face a source of energy, said energy coupled thereto, each of said antenna elements having a first surface facing the source of energy, and a second surface opposite said first surface and facing away from the source of energy;

a plurality of shielding layers, each shielding layer located facing said second surface, such that each of said antenna elements is coupled between said source of energy and said each shielding layer, said each shielding layer including first and second apertures arranged to receive the energy, said first and second apertures operating to separate a first part of the energy having a first polarization from a second part of the energy having a second polarization, where said first aperture is positioned to receive said first part of the energy, and said second aperture is positioned to receive said second part of the energy;

a plurality of energy receiving boards, each board including first and second circuit portions spaced apart from each other, said first circuit portion including a first diode and operative to couple said first part of the energy to produce a first output signal corresponding to said first polarization, said second circuit portion including a second diode and operative to couple said second part of the energy to produce a second output signal corresponding to said second polarization, said second circuit portion using same antenna element as said first circuit portion to couple the energy; and means for appropriately coupling said first and second output signals to sum the energy received by said each board of said plurality of energy receiving boards; and a plurality of resistors, each resistor coupled between each shielding layer, said plurality of resistors arranged to appropriately reverse bias said first and second diodes when the energy is being received, and said plurality of resistors are arranged to provide a discharging path to protect said first and second diodes when the energy is removed, wherein said first and second output signals of each antenna element are connected in a series connection or a parallel connection such that said antenna elements are connected.

2. The system of claim 1, wherein said each shielding layer is a dc isolated ground plane.

3. The system of claim 2, wherein said means for appropriately coupling said first and second signals includes a series dc path provided by said dc isolated ground plane operating to combine said first and second energy polarizations of each antenna element by summing said first and second signals, and by said plurality of resistors arranged to provide appropriate signal ratios between said dc isolated ground planes.

4. The system of claim 3, wherein said plurality of resistors are arranged to provide appropriate signal ratios between antenna elements when energy from each antenna element is combined with a next antenna element.

5. The system of claim 2, wherein said dc isolation is provided by a square ring slot etched on said each shielding layer.

6. The system of claim 2, wherein said first and second diodes are connected to said each shielding layer or dc isolated ground plane through a via connection.

7. The system of claim 1, wherein each of said plurality of resistors are connected between said plurality of shielding layers, where said plurality of resistors provide further isolation of said plurality of shielding layers and provide static discharge protection between said plurality of shielding layers.

8. The system of claim 1, wherein each of said first and second apertures includes a rectangular slot having a length along an axial direction, said axial direction of said first aperture facing in a different direction than said axial direction of said second aperture, said each aperture receiving a different portion of energy in conjunction with each antenna element, where energy from said first aperture is coupled to said first diode, and energy from said second aperture is coupled to said second diode.

9. The system of claim 1, wherein said antenna element is a patch antenna element.

10. The system of claim 1, wherein said antenna elements are arranged as an array in such a configuration as to minimize a total effective area of the system and increase overall system efficiency.

11. The system of claim 1, further comprising:
a plurality of surface wave reducing layers, each surface wave reducing layer coupled between each of said antenna elements and said each shielding layer.

12. The system of claim 11, wherein said each surface wave reducing layer is formed of a low-dielectric lightweight material.

13. A method of receiving and transducing energy, comprising:
separating a first part of the energy having a first polarization from a second part of the energy having a second polarization in a first cell;
coupling said first part of the energy to a first circuit portion of an energy receiving board to produce a first output signal;
coupling said second part of the energy to a second circuit portion of the energy receiving board to produce a second output signal, said second circuit portion spaced apart from said first circuit portion;
appropriately coupling energy of said first and second output signals to sum the energy received by said energy receiving board; and
providing dc isolation to said first cell.

14. The method of claim 13, further comprising:
inserting a shielding layer to shield said first and second circuit portions from RF energy.

15. A method of receiving and transducing energy, comprising:
separating a first part of the energy having a first polarization from a second part of the energy having a second polarization;
coupling said first part of the energy to a first circuit portion of an energy receiving board to produce a first output signal;
coupling said second part of the energy to a second circuit portion of the energy receiving board to produce a second output signal, said second circuit portion spaced apart from said first circuit portion;
appropriately coupling energy of said first and second output signals to sum the energy received by said energy receiving board;
inserting a shielding layer to shield said first and second circuit portions from RF energy;
isolating a plurality of shielding layers; and
coupling said plurality of shielding layers with a plurality of resistors.

16. The method of claim 15, wherein said appropriately coupling energy includes making serial or parallel connection between each of a plurality of first and second circuit portions in said energy receiving boards.

17. The method of claim 15, further comprising:
providing said energy to a load; and
transducing actuators.

18. A circuit for coupling and receiving RF energy and converting the RF energy to rectified dc energy, comprising:
an array of energy receiving elements arranged to face a source of RF energy;
a plurality of rectifying circuits operating to convert the RF energy into stable dc energy, each rectifying circuit including at least two diodes arranged in an opposing manner, said each rectifying circuit serially connected to adjacent rectifying circuits to sum energy coupled in said at least two diodes; and
a plurality of ground planes, each ground plane coupled between each energy receiving element and said each rectifying circuit to minimize any re-radiating back toward the source of RF energy, said each ground plane dc isolated and connected to adjacent ground planes through resistors.

* * * * *